# United States Patent Office 3,565,574
Patented Feb. 23, 1971

3,565,574
CATALYTIC CONVERSION OF EXHAUST GAS IMPURITIES
Kenneth K. Kearby, Watchung, and Harold N. Miller and Anantha K. S. Raman, Millington, N.J., and Joseph Vardi, New York, N.Y., assignors to Esso Research and Engineering Company, a corporation of Delaware
No Drawing. Filed Apr. 23, 1968, Ser. No. 723,573
Int. Cl. B01d 47/00
U.S. Cl. 23—2      4 Claims

ABSTRACT OF THE DISCLOSURE

Exhaust gases are contacted with various unsupported metals and alloys thereof at elevated temperatures to catalytically convert the unburned hydrocarbons, carbon monoxide and nitrogen oxides contained therein. The catalysts maintain high activity and durability for long periods of time when used at temperatures in excess of 800° F. Exemplary catalysts are the metals of Groups I–B and IV to VIII of the Periodic System and various alloys thereof such as the nickel-, iron-, and copper-containing alloys, e.g., Inconel, stainless steel, Monel, etc.

BACKGROUND OF THE INVENTION

Field of the invention

This invention relates to a method for reducing and in some instances substantially eliminating harmful components of gases, particularly exhaust gases from internal combustion engines. In particular, the invention relates to a method for purifying exhaust gases containing unburned hydrocarbons, carbon monoxide and nitrogen oxides by contacting the exhaust gases without adding external oxygen to the exhaust stream with an unsupported catalyst comprised of a metal or alloy thereof of Groups I–B and IV to VIII of the Periodic System to reduce the nitrogen oxides contained therein and/or contacting the exhaust gases with said catalyst in the presence of oxygen or air which is added to the exhaust stream in an amount sufficient to catalytically oxidize the carbon monoxide and unburned hydrocarbons contained therein.

Description of the prior art

Waste products from various sources are discharged into the atmosphere and unless the waste products are treated to remove deleterious components, the waste products may contaminate the atmosphere. A specific example is the case of exhaust products from automotive engines. Such waste products contain one or more harmful components such as unburned hydrocarbons, carbon monoxide, nitrogen oxides, sulfur compounds, partially oxidized products, etc., in various concentrations.

Among the above constituents of exhaust gas, carbon monoxide, unburned hydrocarbons, and nitrogen oxides (e.g., NO) are considered as undesirable from an air pollution standpoint. Carbon monoxide (CO) is harmful for its toxic properties, NO is also physiologically harmful. Hydrocarbons and NO are additionally harmful, even though present in very small amounts, because they participate in a sequence of photochemical reactions which eventuate in the formation of eye-irritating, crop-damaging, visibility-reducing smog. These problems become acute in urban areas where local meteorological conditions prevent the normal upward convective movement of ground-level air for long time periods. The recent and foreseeable future increases in automotive population density in urban areas, with the attendant increase in exhaust emissions, make essential the discovery of effective solutions to these problems through reduction in the amounts of CO, hydrocarbons, and NO discharged from an automotive exhaust.

The nuisance and health menace created by the exhaust gases of internal combustion engines have inspired the invention of many devices for their abatement. So far this problem has been attacked primarily by using combustion to consume unburned or partially burned hydrocarbons in the exhaust gas. In general two approaches have been used: (1) combustion in an afterburner with auxiliary fuel at high temperautres and (2) catalytic oxidation without auxiliary fuel. The first system has a major disadvantage in complexity and also in nonproductive use of fuel. The second system has the disadvantage of heretofore employing a catalyst demanding frequency catalyst regeneration or removal. Also, many of the prior art conversion catalysts perform successfully only under relatively mild operating conditions or in rather specific applications under carefully controlled conditions and such catalysts very often have been unable to withstand extremely severe operating conditions over long periods of time, being susceptible to poisoning influences and poor physical stability.

SUMMARY OF THE INVENTION

In a broad aspect, the present invention provides a method for reducing the quantity of carbon monoxide, unburned hydrocarbons and nitrogen oxide present as pollutants in exhaust gases, which comprises contacting said exhaust gases without the addition of supplemental air or oxygen in the exhaust stream at temperatures in excess of 800° F., with a conversion catalyst comprised of an unsupported metal or alloy thereof including the metals of Groups I–B and IV to VIII of the Periodic System to provide oxidized or less objectionable products suitable for discharge to the atmosphere. In a more specific embodiment of the present invention, there is provided a method for treating exhaust gases of internal-combustion engines in a multiple zone system, which comprises contacting the exhaust gases in a first conversion zone without adding external oxygen or air to the exhaust stream at temperatures in excess of 800° F. with a conversion catalyst comprised of an unsupported metal or alloy thereof of Groups I–B and IV to VIII of the Periodic System to reduce the nitrogen oxide content of said exhaust gases and thereafter contacting the thus treated exhaust gases with said catalyst in a second conversion zone at temperatures in excess of 800° F. in the presence of oxygen or air which is added to the exhaust gas stream in an amount sufficient to catalytically oxidize the carbon monoxide and unburned hydrocarbons contained therein.

The various embodiments of this invention are based on the very important discovery that the metals and alloys described hereinafter are very effective catalysts for the conversion of hydrocarbons, carbon monoxide and nitrogen oxides when used in the unsupported state at very high temperatures. In contrast to the conventional conversion catalysts used in the prior art methods for purifying exhaust gases, the catalysts of this invention are found to be highly resistant at elevated temperatures to the poisoning effects of the various poisons found in exhaust gases such as sulfur, lead, metallic halides, phosphorus, etc. Moreover, the catalysts of the invention maintain their durability when exposed to elevated temperatures for long periods of time.

The catalyst used in this invention is a non-supported catalyst, i.e., the catalyst is neither deposited on nor used to impregnate any carrier or support material, comprising a metal or alloy of a metal chosen from the class consisting of metals of Groups I–B and IV to VIII of the Periodic System. Specific examples of these metals include titanium, vanadium, chromium, manganese, iron, cobalt, nickel, copper, silver, platinum, molybdenum, etc.

Of these, copper, nickel, iron, cobalt, manganese and chromium are preferred. Various alloys of the containing copper, nickel, manganese, cobalt, chromium, and/or iron are preferred for purposes of this invention. Specific examples of such alloy catalysts include, among others, Nichrome (60% Ni, 24% Fe, 16% Cr, 0.1% C), Inconel (73% Ni, 16% Cr and 8% Fe), stainless steel 304 (10% Ni, 19% Cr and 70% Fe), "A" nickel (99% Ni and 1% Co), Monel (66% Ni, 31.5% Cu, 0.9% Mn, 1.35% Fe, 0.12% C, 0.005% S and 0.15% Silicon), cupro nickel (70% Cu and 30% Ni) and the like. Alloy catalyst of the type defined by Inconel, stainless steel and Monel are especially preferred. These alloys are well known and a detailed description thereof is given in Handbook of Chemistry and Physics, 44th Edition, pp. 1528–1540, Chemical Rubber Publishing Co., which reference is incorporated herein by express reference. To produce a large contact surface between the exhaust gas and the metal or alloy catalyst, it is preferred to use the catalyst in a chip or sintered form. However, any other geometric forms of packing such as metallic wool, screens, gauzes, etc., are applicable. Since the catalyst is an alloy or metal packing, it has essentially instantaneous warm-up behavior because of its low specific heat value, its lower weight requirement and the feasibility of exposing the catalyst surface to a direct flame or to electrical heating.

For the reduction of nitrogen oxides, the exhaust gases of internal combustion engines are preferably contacted with the catalysts of the invention at temperatures in excess of 800° F. preferably in excess of 1200° F., in the presence of only small amounts of free oxygen. In this connection, most engine operation is normally under rich-mixture condition because rich-mixture operation is essential for smooth performance of the engine at idle and light load, is essential for high power output at full load, and is also frequently necessary for the suppression of knock in the combustion process. Thus, the exhaust gases coming from the combustion chamber of an internal combustion engine will normally contain only very small amounts of free oxygen, which amounts of oxygen will normally be less than about 2% on a volume basis, e.g., 0.8% volume $O_2$. In accordance with the invention, therefore, the exhaust gases of an internal combustion engine are contacted without adding external oxygen or air to the exhaust stream with a catalyst of the invention to reduce the nitrogen oxide content thereof.

If there is no addition of air or oxygen outside of the engine combustion chamber, i.e., in the exhaust stream, the reduction of the nitrogen oxides in the exhaust gas will be promoted by the catalyst with little oxidation of the carbon monoxide or unburned hydrocarbons contained therein. In this instance, therefore, it may be desirable to thereafter burn the treated exhaust gases having a substantial amount of the nitrogen oxides removed therefrom, in the presence of a controlled amount of additional air by the use of an oxidation catalyst system or afterburner device.

In a preferred embodiment of the invention, the treated exhaust gases having a substantial proportion of the nitrogen oxides removed therefrom will then be contacted with the catalyst at temperatures in excess of 800° F. in the presence of oxygen or air which is added to the exhaust gas stream in an amount sufficient to catalytically oxidize the carbon monoxide and unburned hydrocarbons contained therein. In general, the presence of an amount of oxygen within the range between about 2 and 10 volume percent or higher will be sufficient to effect a substantial oxidation of the unburned hydrocarbons and carbon monoxide contained in the exhaust gases.

In the one zone system favoring the conversion of nitrogen oxides, it is preferred to employ a Monel-type catalyst at a temperature within the range between about 800° F. and 1500° F., e.g., 1400° F., or an Inconel-type or stainless steel-type catalyst at a temperature within the range between about 1200° F. and 1900° F., e.g., 1800° F.

An especially preferred embodiment of this invention comprises contacting exhaust gases containing unburned hydrocarbons, carbon monoxide and nitrogen oxides without adding external oxygen or air to the exhaust stream at temperatures within the range between about 1200° and 1500° F., e.g., 1400° F., with an active catalyst comprising an unsupported alloy of the Monel-type (i.e., alloys consisting essentially of Ni and Cu with various amounts of other metals) to reduce a substantial proportion of the nitrogen oxides contained therein and thereafter contacting the thus treated exhaust gases at a temperature within the range between about 1200° and 1900° F., e.g., 1400° F., with an unsupported catalyst of the Inconel-type (i.e., alloys consisting essentially of Ni, Cr, and Fe with small amounts of various other metals) or of the stainless steel-type (i.e., alloys consisting essentially of Fe, Cr and Ni with small amounts of various other elements) in the presence of sufficient oxygen to oxidize a substantial portion of the unburned hydrocarbons and carbon monoxide.

The exhaust gases treated in accordance with the invention may be passed over the catalyst under varying conditions, e.g., space velocities of 1000 to 500,000 (STP) volumes per volume of catalyst per hour, at temperatures in the range of 800° to 2200° F., and under pressure of about near-atmospheric to 50 p.s.i.g.

DESCRIPTION OF THE PREFERRED EMBODIMENTS

Example 1

Although the prior art conversion catalysts including various supported metals, oxides and salts deteriorate at high operating temperatures and/or lose their activity due to the presence of various poisons such as sulfur compounds, lead compounds, halides, etc. in exhaust gases, it has been found that the catalysts of this invention are highly durable and maintain their activity when exposed at high temperatures to exhaust gases containing substantial amounts of various catalyst poisons.

In this example, reduction of NO to $N_2$ was carried out by passing a synthetic exhaust gas containing on a volume basis 2% CO, 10% $CO_2$, 12% $H_2O$ and 1130 parts per million (p.p.m.) NO with $N_2$ accounting for the remainder over a catalyst consisting of sintered Monel contained in a Vycor tube passing through a furnace. The Monel catalyst was characterized by a surface area of about 0.03 square meter per gram and an average pore diameter of about 20 microns. The NO conversion for an exhaust gas having a space velocity of about 150,000 v./v./hr. was obtained at 1200° F. and 1500° F. by infrared analysis of the effluent gas. In another series of tests, the same test conditions described above were used with the exception that 200 p.p.m. of $SO_2$ was added to the aforedescribed synthetic exhaust gas. The results which are set forth below in Table I show that the Monel catalyst described herein is a very effective catalyst for the conversion of nitrogen oxides contained in exhaust gases and that the catalyst is highly resistant to sulfur poisoning when used at temperatures in excess of 1200° F.

TABLE I

| Temperature of catalyst bed, ° F. | Nitrogen oxide conversion [1] | |
|---|---|---|
| | Sulfur free exhaust gas, percent | Exhaust gas containing $SO_2$, percent |
| 1,200 | 81 | 23 |
| 1,500 | 99 | 98 |

[1] Conversion after operation for about one-half hour.

Example 2

In the manner of Example 1, a feed gas containing 2% CO, 10% $CO_2$, 12% $H_2O$, 950 p.p.m. NO and the balance nitrogen (volume basis) was passed at a space velocity of about 150,000 v./v./hr. over a catalyst consisting of Monel chips characterized by a surface area of 0.0002 square meter per gram or sintered Monel chips characterized by a surface area of about 0.03 square meter per gram and an average pore diameter of about 20 microns contained in a Vycor tube. The nitrogen oxide conversion obtained at various temperatures are given below in Table II.

TABLE II

| Temperature of catalyst bed, °F. | Nitrogen oxide conversion, percent | |
|---|---|---|
| | Monel chips | Sintered Monel chips |
| 1,000 | 23 | 49 |
| 1,100 | 45 | 65 |
| 1,200 | 72 | 81 |
| 1,300 | 92 | 94 |
| 1,400 | 99 | 97 |

The results given above in Table II show that Monel is a very effective catalyst for the conversion of nitrogen oxide in exhaust gases, especially at operating temperatures in excess of 1200° F.

Example 3

Under normal operating conditions the exhaust gases from internal combustion engines will contain an insufficient amount of oxygen to catalytically or thermally oxidize the unburned hydrocarbons and carbon monoxide contained therein. In such a case, it will be preferable to first catalytically reduce the nitrogen oxides in the exhaust gases in the manner of Examples 1 and 2 and to thereafter add additional air to the thus treated exhaust gases so that said exhaust gases may be contacted with a catalyst of the invention in the presence of a sufficient amount of oxygen to catalytically oxidize the carbon monoxide and unburned hydrocarbons contained therein.

In the manner of Example 1, an oxygen enriched exhaust gas containing on a volume basis 2% CO, 8% $O_2$ (exhaust gases coming from the combustion chamber normally contain about 1% $O_2$) 300 p.p.m. unburned hydrocarbons (i.e., propane and propene) 0.6% $H_2$, 10% $CO_2$ and 12% $H_2O$ with $N_2$ accounting for the remainder was contacted with a stainless steel alloy (type 347—18% Cr, 9% Ni, 0.08% C, 2.0% Mn, 0.05% P, 0.03% S, 1% Si, balance Fe) characterized by a surface area of <1.0 square meter per gram and an average pore diameter of about 20 microns at temperatures ranging from about 1100° F. and 1300° F. The results given below show that the stainless steel alloy is a very effective catalyst for the oxidation of hydrocarbons and carbon monoxide.

TABLE III

| Temperature of catalyst bed, °F. | Carbon monoxide and hydrocarbon conversions with stainless steel catalyst | |
|---|---|---|
| | Hydrocarbon conversion, percent | Carbon monoxide conversion, percent |
| 1,100 | 30 | 72 |
| 1,200 | 52 | 89 |
| 1,300 | 64 | 94 |

Example 4

This example illustrates the advantages of the present invention with respect to reducing the nitrogen oxide content of automoblie exhaust gases.

Using the standard composite California Cycle Test described in detail under the heading "The California Motor Vehicle Emission Standards" by C. G. Hass in the Journal of the Society of Automotive Engineers, August 1960, an automobile exhaust system having a housing(s) containing about 10 pounds of the Monel catalyst described in Example 1 was connected to a V-8, 283 cu. in. Chevrolet engine which was run on a commercial lead-free gasoline containing about 20 parts per million (p.p.m.) sulfur. The exhaust gas space velocity and the catalyst temperature were within the range of 150,000 v./v./hr. and 1200°–1500° F., respectively. The nitrogen oxide content of the effluent exhaust gases from the vehicle exhaust gas system containing in one instance no catalyst and in another instance the Monel catalyst was measured in accordance with the California procedure after the vehicle was run continuously for 1300 miles of "Suburban" and then 2800 miles of "Turnpike" type driving. The results given below in Table IV show that the Monel catalyst is very effective in reducing the nitrogen oxide content of automobile exhaust gases even after long exposure to sulfur poisoning.

TABLE VI

Composite Califormina cycle bag values, NO, p.p.m.

| | |
|---|---|
| Vehicle (without catalyst) | 721 |
| Vehicle with catalyst after 1300 miles of "Suburban" driving | 191 |
| Vehicle with catalyst after additional 2800 miles of "Turnpike" driving | *127 |

*Total mileage accumulation of 4100 miles.

Example 5

This example illustrates the ability of the catalysts of this invention to maintain their activity when exposed to elevated temperatures and the poisoning effects of lead and sulfur compounds for long periods of time.

In another test, a Chevrolet V-8, 283 cu. in. Chevrolet engine was run in Suburban-type driving for 6000 miles using a commercial gasoline containing about 3 cc./gal. of tetraethyl lead and about 100 p.p.m. of sulfur. The exhaust gases from the engine were contacted with a catalyst consisting of Inconel chips having a surface area of <1.0 square meters per gram at a temperature of about 1800° F. and a space velocity in the order of 20,000 v./v./hr. After the catalyst had been continuously exposed to the engine exhaust gases for 6000 miles, the temperature was reduced to about 1325° F. and a sample of the effluent gas was then analyzed by infrared analysis. The results given below in Table V clearly show that Inconel is an effective catalyst for the reduction of nitrogen oxides contained in automobile exhaust gases and that said catalyst is highly resistant to lead and sulfur poisoning.

TABLE V.—COMPOSITION OF AUTOMOBILE EXHAUST GASES EXPOSED TO INCONEL

| | |
|---|---|
| NO. p.p.m.* | |
| B | 580 |
| A | 100 |
| CO. percent | |
| B | 2.5 |
| A | 2.5 |
| Hydrocarbon, p.p.m.* | |
| B | 780 |
| A | 630 |
| $CO_2$, percent: | |
| B | 12.3 |
| A | 12.4 |

*Parts per million.
B—Before exposure of exhaust gas to catalyst.
A—After exposure of exhaust gas to catalyst.

It is to be understood that the examples presented herein are intended to be merely illustrative of the invention and not as limiting it in any manner; nor is the invention to be limited by any theory regarding its operability. The scope of the invention is to be determined by the appended claims.

What is claimed is:

1. A process for reducing the nitrogen oxide content of a fuel rich exhaust gas stream from an internal combustion engine which comprises contacting said stream with a catalyst comprising an unsupported nickel-copper alloy at a temperature above 800° F. without adding external oxygen to said exhaust gas stream.

2. A method according to claim 1 in which said alloy is Monel metal.

3. A method according to claim 1 in which oxygen or air is added to the catalytically treated exhaust gas of reduced nitrogen oxide content and then carbon monoxide and unburned hydrocarbons in the resulting gas mixtures are catalytically oxidized.

4. A method according to claim 1 in which the temperature at which said fuel-rich exhaust gas is contacted with said nickel-copper catalyst is above about 1200° F.

References Cited

UNITED STATES PATENTS

| | | | |
|---|---|---|---|
| 2,004,865 | 6/1935 | Grison | 23—2 |
| 2,071,119 | 2/1937 | Harger | 23—2 |
| 3,254,966 | 6/1966 | Bloch et al. | 23—2 |
| 3,316,057 | 4/1967 | Howk et al. | 23—2 |
| 3,370,914 | 2/1968 | Gross et al. | 23—2 |
| 3,476,508 | 11/1969 | Kearby et al. | 23—2 |

FOREIGN PATENTS

| | | | |
|---|---|---|---|
| 418,790 | 10/1934 | Great Britain | 23—2 |

EARL C. THOMAS, Primary Examiner

U.S. Cl. X.R.

23—159, 252—474, 477